Nov. 14, 1933.  J. B. WHITEHEAD  1,935,532
INSULATION OF HIGH VOLTAGE CONDUCTORS
Filed April 27, 1931
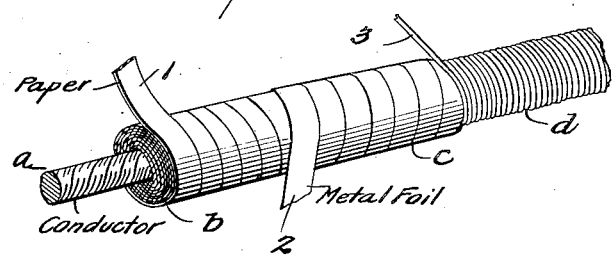
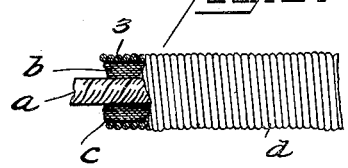

Patented Nov. 14, 1933

1,935,532

UNITED STATES PATENT OFFICE 1,935,532

INSULATION OF HIGH VOLTAGE CONDUCTORS

John Boswell Whitehead, Baltimore, Md.

Application April 27, 1931. Serial No. 533,299

5 Claims. (Cl. 173—264)

This invention relates to the insulation of conductors for carrying high voltage currents. Such conductors are commonly covered with insulation consisting of a succession of layers of paper tape wound tightly around the conductor and then dried, evacuated and impregnated with oil. Following or preceding the impregnation process, the cable is, in some cases, served with a single layer of metal tape, and the cable is then encased in a lead envelope or sheath applied by hydraulic pressure in a suitable press. The lead sheath, together with the metal tape referred to, when present, serve as an outer electrical conductor which is at ground potential with full voltage of the circuit being thus applied to the wall of the insulation between the conductor and tape, or sheath.

I have found that the dielectric strength and the life of insulation of the character mentioned are both materially increased by rendering the insulation more compact or dense. A certain increase in density is obtainable by wrapping the paper tape as tightly as possible and also by wrapping the outer metal tape under high tension. To secure greater density, however, I apply to the outer side of the insulation wall a thin metal foil, in a continuous layer, and I then apply to the outside of this metal foil a close fitting spiral of strong linen or cotton thread which is tightly wound around and completely covers the foil. As the thread is applied under tension, the metal foil is compressed into intimate contact with the wall of the insulation and the insulation is subjected to a progressive squeezing process, which eliminates air pockets and makes it more dense.

The advantages of this construction are increased density of the insulation wall and higher dielectric strength; intimate contact between successive layers of insulation, eliminating air pockets and reducing the possibility of internal corona or ionization. Because of the increased density, the number and thickness of the layers of insulation may be reduced, correspondingly reducing the films and oil paths within the insulation, resulting in less electric conduction, lower dielectric loss, reduced oxidation and other deterioration processes, and increased life for the insulation.

In the accompanying drawing:

Fig. 1 is a perspective view of a portion of an insulated conductor illustrating the manner of carrying out the invention, and, Fig. 2 is a side view partly in section, of part of the completed cable.

Referring to the drawing, $a$ indicates an electrical conductor and $b$ indicates the insulation thereon, which may be of various kinds but preferably consists of a succession of layers of tightly wound paper tape 1, which, after being applied to the conductor, is impregnated with oil. A continuous thin metal foil covering $c$ incloses the insulation, the foil being preferably applied in the form of a spirally wound tape 2. After the application of the foil, the entire structure is wound with a close fitting spiral $d$ of strong thread 3, applied under tension. As the application of the thread progresses, there results a progressive squeezing of the insulation which eliminates air pockets and makes the insulation wall more dense, and at the same time the thin metal foil is progressively pressed into intimate contact with the outer wall of the insulation. The advantages resulting from this construction have been hereinbefore referred to and need not be repeated.

While the invention is adapted particularly for cables carrying high voltage currents, in which it is desirable to surround the insulation with a layer of metal, it will be obvious that the application of the thread covering, in the manner described, to paper or other insulating materials, without the metal envelope, will improve the density of the insulation by eliminating the air pockets between the layers.

It may be desirable, in some cases, to substitute a strand of fine wire for the thread, and this will be closely wound, under tension, over the metal foil, or directly on the insulation, in the same way as the thread.

What I claim is:

1. An electrical conductor, a covering of insulation thereon, a layer of metal foil surrounding the insulation, and a spiral of strong thread, having close fitting convolutions wound about the foil with sufficient tightness to condense the insulation and practically exclude voids therefrom, said thread covering the foil and compressing it into intimate contact with the insulation.

2. An electrical conductor, a covering of insulation thereon, composed of superposed layers of paper, a layer of metal foil surrounding the insulation, and a spiral of strong thread, having close fitting convolutions wound about the foil with sufficient tightness to condense the insulation and practically exclude voids therefrom, said thread covering the foil and compressing it into intimate contact with the insulation.

3. An electrical conductor, a covering of insulation thereon composed of superposed layers of paper, impregnated with oil, a layer of metal foil surrounding the insulation, and a spiral of strong thread, having close fitting convolutions wound about the foil with sufficient tightness to condense the insulation and practically exclude voids therefrom, said thread covering the foil and compressing it into intimate contact with the insulation.

4. An electrical conductor, a covering of insulation thereon, a layer of metal foil surrounding the insulation, and a spiral of fine wire, having close-fitting convolutions wound about the foil with sufficient tightness to condense the insulation and practically exclude voids therefrom, said wire covering the foil and compressing it into intimate contact with the insulation.

5. An electrical conductor, a covering of insulation thereon, a layer of metal foil surrounding the insulation, and a fine strand of suitable material, having close-fitting spiral convolutions wound about the foil with sufficient tightness to condense the insulation and practically exclude voids therefrom, said strand covering the foil and compressing it into intimate contact with the insulation.

JOHN BOSWELL WHITEHEAD.